Sept. 8, 1942.    J. H. SULZER    2,295,367
ELECTRICAL CONNECTING APPARATUS
Filed April 9, 1940
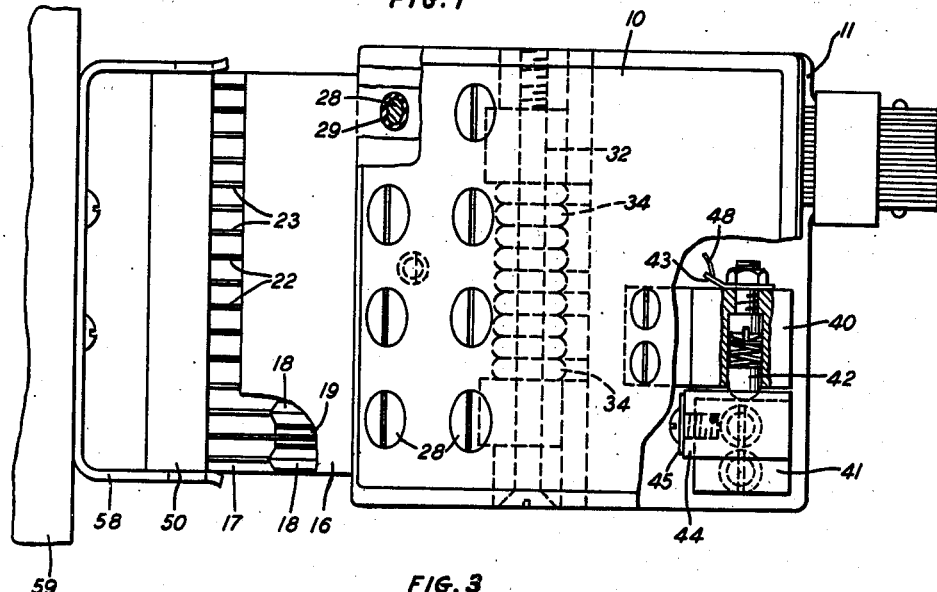
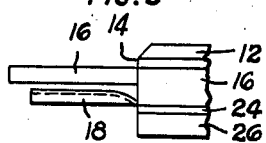
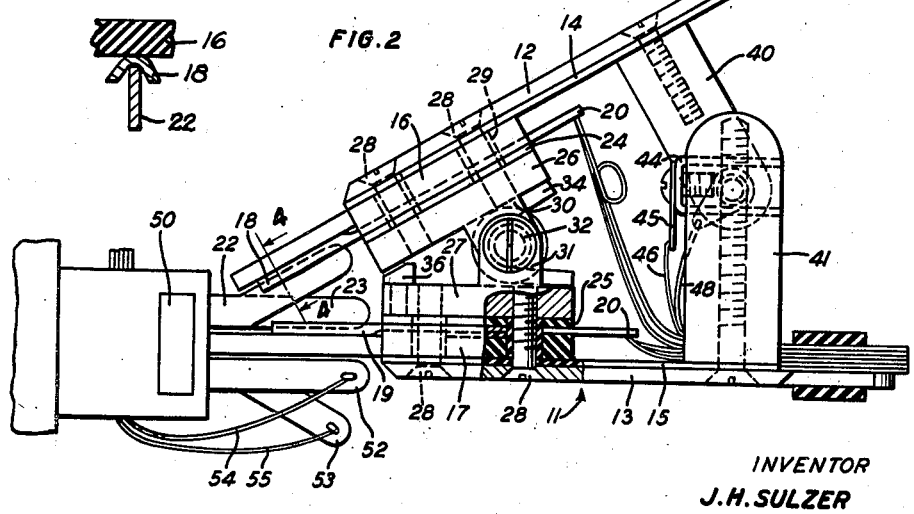
INVENTOR
J. H. SULZER
BY
E. R. Nowlan
ATTORNEY Patented Sept. 8, 1942

2,295,367

UNITED STATES PATENT OFFICE 2,295,367

ELECTRICAL CONNECTING APPARATUS

John H. Sulzer, Westfield, N. J., assignor to Western Electric Company, Incorporated, New York, N. Y., a corporation of New York Application April 9, 1940, Serial No. 328,644

3 Claims. (Cl. 173—324)

This invention relates to electrical connecting apparatus, and more particularly to the type used in testing electrical apparatus.

In testing electrical circuits and units of electrical structures the problem, of constructing a test set capable of performing the desired tests and also means to readily connect the electrical circuits or units that are to be tested thereto, arise. The number of electrical circuits or units in each structure to be tested determines the complexity of the problem. For example, when an electrical structure contains several electrical circuits and units to be tested separately and in definite order, this necessarily complicates the testing set and requires the connecting means to be of a structure capable of accurately connecting various circuits and units to the proper testing equipment of the apparatus. The time and effort required for an operator to make and break these various connections are greatly reduced when it is possible to make all connections simultaneously and break them all simultaneously.

An object of the invention is to provide an electrical connecting apparatus which is simple in construction and capable of accurately making and breaking electrical connections of structures.

With this and other objects in view, the invention comprises an apparatus having opposing spring controlled members with rows of grooved contacts for engaging rows of terminals of electrical circuits or units to be tested.

Other objects and advantages will be apparent from the following detailed description when taken in conjunction with the accompanying drawing, wherein Fig. 1 is a top plan view of the apparatus shown connected to an electrical structure to be tested, with portions of the apparatus broken away to illustrate certain details thereof;

Fig. 2 is a side elevational view of the structure shown in Fig. 1;

Fig. 3 is a fragmentary detailed portion of the apparatus, and

Fig. 4 is a fragmentary sectional view taken substantially along the line 4—4 of Fig. 2.

Attention is now directed to Figs. 1 to 4 inclusive of the drawing, wherein opposing spring controlled portions are indicated generally at 10 and 11. These portions consist of outer plate members 12 and 13, respectively, having insulating members 14 and 15 disposed adjacent their inner surfaces and fixed thereto. Upon the insulating members 14 and 15 are disposed insulating strips 16 and 17, respectively, which extend forwardly of their respective plates 12 and 13 distances illustrated in Fig. 2 and extend laterally distances illustrated in Fig. 1, which are just short of the full width of the plates 12 and 13 for the portions extending beyond the plates and for the full width of the plates at the portions disposed adjacent thereto. A plurality of resilient contacts 18 and 19 is disposed adjacent their respective insulating strips 16 and 17. These contacts are all identical in construction and are formed of suitable material, such as phosphor-bronze. Extending from the inner ends 20 of the contacts (Fig. 2) to positions slightly beyond the forward edges of the plates 12 and 13, the contacts are flat but from the last mentioned points forwardly the contacts are formed V-shaped in cross section as illustrated in Fig. 4. These V-shaped portions of the contacts are normally spaced from their respective insulating strips 16 and 17 as illustrated in Fig. 3, and the flat portions between the V-shaped portions and the forward edges are sufficiently resilient to normally position the contacts from the insulating strips and allow these portions to be forced against the insulating strips while the apparatus is in use. In the present instance there are eight contacts carried by each opposing portions 10 and 11, the contacts on one being positioned in staggered relation with those of the other so as to electrically engage staggered rows of equally spaced terminals 22 and 23, respectively. The insulating strips 16 and 17 are grooved to equally space the contacts 18 and 19. Other insulating strips 24 and 25 are disposed adjacent their respective contacts and insulating strips as shown in Fig. 2.

Pivotal supports 26 and 27 extend the full width of their respective plates 12 and 13 and are joined thereto and to the insulating strips and insulating members by suitable means, such as screws 28, extending through suitable bushings 29 between certain of the contacts and threadedly disposed in apertures in the pivotal supports. The supports 26 and 27 have outwardly projecting lugs 30 and 31, respectively, at spaced positions and with axially aligned apertures for receiving a pivot screw 32 passing through the apertures in the lugs including a threaded aperture in one of the end lugs. A pair of springs 34 disposed concentric with the pivot screw 32 and having the ends thereof engaging the rearward portions of the supports normally urges the supports 26 and 27 counterclockwise and clockwise, respectively, to positions controlled by a stop 36 carried by the support 27 and positioned to be engaged by the support 26. Switch supporting members 40 and 41 are respectively secured to the plates 12 and 13 adjacent one side thereof, as shown in Fig. 1, and extend at right angles with respect thereto so that the inner ends thereof may move adjacent each other.

A spring pressed switch member 42 is disposed in the supporting member 40 in electrical engagement with a terminal 43. A U-shaped switch member 44 is mounted on the support 41 and carries a terminal 45. The shape of the switch member 44 is such that it provides spaced engaging portions for the switch member 42, as illustrated in Fig. 2. A conductor 46 extends from the terminal 45 of the switch member 44 to a ground (not shown), while a conductor 48 extends from the terminal 43 to the main portion of a control circuit (not shown).

In the present embodiment the electrical structure to be tested is a portion of a telephone apparatus including a terminal strip 50 having the terminals 22 and 23 which are to be connected to other electrical circuits of telephone apparatus when installed and are electrically connected to or are a part of other electrical terminals 52 and 53, respectively. The last mentioned terminals are electrically connected through conductors 54 and 55, respectively, to electrical circuits and units of the structure to be tested. The terminal strip 50 is removably supported by a bracket 58 mounted upon a frame 59 of the electrical structure to be tested. It will be observed, by viewing Figs. 1 and 2, that the insulating strip 17 cooperates with the bracket 58 to guide the contacts 18 and 19 in aligned positions with respect to their terminals.

In the operation of the apparatus it will be observed, by viewing Figs. 1 and 2, that the terminals 52 and 53 are electrically connected to electrical units 59 to be tested. Each terminal 52 is electrically connected to its respective terminal 22 and in the same manner each terminal 53 is electrically connected to its respective terminal 23. Therefore, when the contacts 18 and 19 of the apparatus are electrically connected to a test set it is possible to electrically connect each unit to be tested thereto by connecting the apparatus to the terminals 22 and 23 of the terminal strip. This is made possible by moving the opposing members 10 and 11 of the apparatus about their pivot 32 so as to move the contacts 18 and 19 away from each other a sufficient distance so that the insulating strip 17 and the contacts 19 may be inserted between the sets of terminals as shown in Fig. 2. The insulating strip, therefore, serves as a guide in passing between the sets of terminals, to properly position the contacts relative to their respective terminals. The operator may release the opposing members and in doing so the springs 34 will force the member 10 about the pivot 32 to move the contacts 18 into intimate engagement with their terminals 22 and to draw the contacts 19 into intimate engagement with their terminals 23. When this has been accomplished the electrical units to be tested are electrically connected to the test set. During this relative movement of the opposing members 10 and 11 the switch members 42 and 44 are moved relative to each other and through successive positions to control the test set.

The V-shape of the contacts 18 and 19 causes a wiping action on their terminals to assure positive connections The embodiment of the invention herein disclosed is merely illustrative and may be modified and departed from in many ways without departing from the spirit and scope of the invention as pointed out in and limited solely by the appended claims.

What is claimed is:

1. A connecting apparatus comprising opposing members mounted for relative movement, contacts formed of resilient conductive material carried by the members to electrically engage terminals of electrical units, and insulating members spaced from the contacts and cooperating therewith to limit bending of the contacts when the contacts are disposed in engagement with the terminals.

2. A connecting apparatus comprising opposing members mounted for relative movement, contacts formed of resilient conductive material carried by the members in staggered relationship to electrically engage terminals of electrical units, and insulating members normally spaced from the contacts to limit bending of the contacts when the contacts are disposed in engagement with the terminals, one of the insulating members serving to guide the contacts relative to the terminals.

3. A connecting apparatus comprising opposing dielectric members, pivotal means to support the members for relative movement about a common axis, a series of spaced resilient contacts mounted for movement with one of the members and normally lying in a common plane parallel with and spaced from the said member, and means to cause movement of the members about the said axis to move the contacts into engagement with similarly spaced terminals of electrical units, flex the contacts and force the contacts into more intimate engagement with the terminals.

JOHN H. SULZER.